US009272776B2

(12) United States Patent
Bellet et al.

(10) Patent No.: US 9,272,776 B2
(45) Date of Patent: Mar. 1, 2016

(54) DEVICE FOR INTERMEDIATE FASTENING BETWEEN AN AIRCRAFT FUSELAGE AND AN AIRCRAFT LANDING GEAR

(71) Applicant: Airbus Operations S.A.S., Toulouse (FR)

(72) Inventors: Daniel Bellet, Saint-Lys (FR); Guillaume Gallant, Lareole (FR)

(73) Assignee: AIRBUS OPERATIONS S.A.S, Toulouse (FR)

( * ) Notice: Subject to any disclaimer, the term of this patent is extended or adjusted under 35 U.S.C. 154(b) by 158 days.

(21) Appl. No.: 14/093,862

(22) Filed: Dec. 2, 2013

(65) Prior Publication Data

US 2014/0151500 A1 Jun. 5, 2014

(30) Foreign Application Priority Data

Nov. 30, 2012 (FR) ...................................... 12 61473

(51) Int. Cl.
*B64C 25/10* (2006.01)
*B64C 25/20* (2006.01)
*B64C 25/04* (2006.01)
*B64C 25/12* (2006.01)

(52) U.S. Cl.
CPC ................. *B64C 25/20* (2013.01); *B64C 25/04* (2013.01); *B64C 25/10* (2013.01); *B64C 2025/125* (2013.01)

(58) Field of Classification Search
None
See application file for complete search history.

(56) References Cited

U.S. PATENT DOCUMENTS

| | | | | |
|---|---|---|---|---|
| 2,005,980 A * | 6/1935 | Minshall | .................... | 244/102 R |
| 2,351,215 A * | 6/1944 | Kleinhans et al. | ......... | 244/102 R |
| 2,403,835 A * | 7/1946 | Villcpigue | ................ | 244/102 R |
| 2,478,426 A * | 8/1949 | Satre | .......................... | 244/102 R |
| 2,752,112 A * | 6/1956 | Payne, Jr. | ................... | 244/102 R |
| 2,869,806 A * | 1/1959 | Beach | ........................ | 244/102 R |
| 2,973,168 A * | 2/1961 | Hartel | ........................ | 244/104 R |
| 3,119,502 A * | 1/1964 | Paul | .............................. | 414/474 |
| 3,160,371 A * | 12/1964 | Doolittle | .................... | 244/110 A |
| 3,261,574 A * | 7/1966 | Bowdy | ........................ | 244/102 R |
| 3,285,541 A * | 11/1966 | Fehring et al. | .................. | 244/50 |
| 3,991,957 A * | 11/1976 | Neumann | .................. | 244/102 R |
| 4,345,727 A * | 8/1982 | Brown et al. | .............. | 244/102 R |
| 5,022,609 A * | 6/1991 | Cranston | .................... | 244/102 R |
| 5,435,504 A * | 7/1995 | Inoue et al. | ...................... | 244/13 |
| 6,345,787 B1 * | 2/2002 | Tighe et al. | ............... | 244/102 R |
| 6,464,168 B1 * | 10/2002 | Swannell et al. | ......... | 244/102 A |
| 6,651,931 B1 * | 11/2003 | Fox et al. | ................... | 244/104 R |
| 6,679,452 B1 * | 1/2004 | Cottet et al. | .............. | 244/102 R |
| 6,715,714 B2 * | 4/2004 | Temple | .................... | 244/104 CS |
| 6,811,116 B1 * | 11/2004 | Briancourt | ................ | 244/102 R |
| 7,287,726 B2 * | 10/2007 | Briancourt | ................ | 244/102 R |
| 7,416,156 B2 * | 8/2008 | Hinton | ....................... | 244/102 R |
| 7,798,444 B2 * | 9/2010 | Wood | ......................... | 244/102 A |

(Continued)

*Primary Examiner* — Christopher P Ellis
*Assistant Examiner* — Medhat Badawi
(74) *Attorney, Agent, or Firm* — Ingrassia Fisher & Lorenz, P.C.

(57) ABSTRACT

A device for intermediate fastening between an aircraft fuselage and an aircraft landing gear is provided. The device includes at least one semi-open support structure comprising a pair of webs, which are substantially parallel to each other. The webs comprise first support means intended to receive the main pivot shaft of the landing gear and second support means intended to receive the stay joint or joints of the landing gear. The device includes two support structures linked together by a central box structure. The central box structure includes a front wall, a rear wall and linking walls linking those two walls.

19 Claims, 5 Drawing Sheets

(56) References Cited

U.S. PATENT DOCUMENTS

| | | | | |
|---|---|---|---|---|
| 8,256,714 | B2* | 9/2012 | Zhao | 244/120 |
| 8,313,131 | B2* | 11/2012 | Hallett et al. | 294/82.1 |
| 8,317,130 | B1* | 11/2012 | Westman | 244/102 R |
| 2010/0140394 | A1* | 6/2010 | Brookfield | 244/102 R |
| 2011/0284683 | A1* | 11/2011 | Liu | 244/12.3 |
| 2013/0056582 | A1* | 3/2013 | De Conto et al. | 244/102 A |
| 2014/0103162 | A1* | 4/2014 | Thomas et al. | 244/119 |
| 2014/0151500 | A1* | 6/2014 | Bellet et al. | 244/102 A |
| 2014/0260187 | A1* | 9/2014 | Otto | 60/263 |

\* cited by examiner

DEVICE FOR INTERMEDIATE FASTENING
BETWEEN AN AIRCRAFT FUSELAGE AND
AN AIRCRAFT LANDING GEAR

CROSS-REFERENCE TO RELATED
APPLICATION

This application claims priority to French Patent Application No. 1261473, filed Nov. 30, 2012, which is incorporated herein by reference in its entirety.

TECHNICAL FIELD

This application pertains to a device for intermediate fastening between an aircraft fuselage and an aircraft landing gear.

BACKGROUND

Generally, the landing gear or landing gears of an aircraft are housed in a gear compartment situated in a reserved space, named gear bay, situated within the flanks of the bottom part of the fuselage and which may extend to a part of the wing.

This compartment plays a dual role according to whether the aircraft is in flight or on the ground.

During flight, the compartment isolates the gear from the aerodynamic flows so as to improve the performance of the aircraft.

On the ground, it has the role of transmitting the loads induced by the landing gear to the structure of the fuselage.

Currently, the parts constituting the landing gear are linked to the fuselage via its skin in rigid zones, and/or to the roof of the landing gear compartment constituting the limit between the pressurized zone (cabin) and the unpressurized zone of the fuselage.

In aircraft structures of the prior art, during movement of the aircraft along the ground, the loads coming from the wheels are transmitted to the bearings of the landing gear joints.

As these joints are linked to the skin of the aircraft fuselage and are also linked to the roof of the landing gear bay, it is the skin and the bay that transmit the loads induced by the landing gear to the fuselage structure.

On account of this, the zones concerned of the skin and of the bay are required to be reinforced in order not to undergo excessive deformations.

In particular, the bay roof has to bear the local torsional moment applied to the bay roof by the stay.

Furthermore, at present, on account of their structure and their fastening, the landing gears of an aircraft are mounted very early in the assembly chain of the aircraft. Thus, they generally cannot be tested independently.

Furthermore, the landing gear is very dependent upon the structure of the compartment. There is thus currently very little flexibility regarding the mounting of the landing gear.

In addition, other objects, desirable features and characteristics will become apparent from the subsequent summary and detailed description, and the appended claims, taken in conjunction with the accompanying drawings and this background.

SUMMARY

According to various embodiments, the present disclosure provides improvements to the front aircraft structures provided with landing gears as set out above.

To that end, the present disclosure concerns a device for intermediate fastening between an aircraft fuselage and an aircraft landing gear, the landing gear being adapted to pivot around at least one main shaft and to be hinged around at least one stay joint, to enable the extension or the retraction of the gear and comprising a leg bearing wheels which is linked to the main shaft and a stay linking the leg to the stay joint.

The intermediate fastening device is composed of at least one support structure which comprises first support means intended to receive said at least one main shaft and second support means intended to receive said at least one stay joint The device comprises two support structures linked together by a central box structure, the central box structure comprising a front wall, a rear wall and linking walls linking those two walls.

In one example, the stay joint may be a ball joint or a shaft according to the type of landing gear used.

An advantage of such an intermediate fastening device is to transfer the loads induced by the wheels of the landing gear to the fuselage when the aircraft moves along the ground without having to reinforce (and thus make heavier) the structure of the fuselage, the major part of those loads being taken by the intermediate fastening device.

A second advantage of the device lies in the fact that the assembly composed of the intermediate fastening device and the landing gear is totally independent from the aircraft and is ready to be installed or be provided as a kit at any time of the assembly.

It is thereby possible to install the landing gear at any time during the assembly, for example right at the end of the assembly.

Furthermore, such a provision makes the mounting of the landing gear faster and simpler.

Moreover, the mounting of the assembly composed of the intermediate fastening device and the landing gear may be carried out independently of the rest of the mounting of the parts of the aircraft.

The independence conferred by the intermediate fastening device also enables tests to be carried out of the systems inherent to the landing gear independently and/or in parallel with the assembly of the rest of the parts constituting the aircraft.

Once the central box structure has been mounted on the aircraft, it is intended to be transverse to the longitudinal axis of the aircraft.

In one example, the central box structure links the wings of each pair which comprise the second support means.

The central box structure is advantageously dimensioned such that its structure takes part of the loads induced by the wheels of the landing gear on the leg and the stay.

This makes it possible to further reduce the reinforcement of the structure of the fuselage and thus its mass.

Furthermore, an assembly is thus obtained that is independent bearing by itself the landing gears of an aircraft, which further facilitates mounting and demounting.

By "independent" is understood here the fact that all the fastening interfaces of the landing gear are attached to the intermediate fastening device, and not to another part or member of the aircraft.

Thus, the demounting of the landing gear is carried out via the intermediate fastening device uniquely.

To be precise, the number of interfaces with the fuselage is thereby reduced which enables better mastery of the tolerances required on mounting and simplification of the maintenance operations.

Such a choice of structure enables the central box structure to efficiently fulfill its function of taking the loads without excessively increasing the mass of the aircraft.

It is however to be noted that the central box structure may also have a cylindrical shape. According to a possible feature, said at least one support structure is hollow. This makes it possible in particular to reduce the mass of the intermediate fastening device and to house equipment in the internal space of the support structure.

According to a possible feature, the assembly composed of the support and central box structures are made as a single part.

This simplifies the mounting of the intermediate fastening device on an aircraft fuselage.

In order not to increase the mass of the intermediate fastening device, the central box structure is hollow.

Advantageously, the central box structure has an internal space intended for the installation of means for imparting motion to the leg and the stay for the extension and the retraction of the gear.

In one example, this space is situated between the two support structures, in the center of the box structure. It for example contains the drive systems and the hydraulic or electric jacks enabling motion to be imparted to the landing gear.

As a further example, this space may be parallelepiped.

In order for the loads from movement of the aircraft along the ground to be transmitted as directly as possible to the most robust parts of the aircraft fuselage, the first and second support means are intended, when the fastening device is mounted on an aircraft fuselage, to be situated in the immediate neighborhood of the reference datum line of the aircraft fuselage (or neutral line).

Thus, the loads induced during movement of the aircraft along the ground are transmitted to the fuselage tangentially at the fuselage skin.

Such a feature also results in reducing the value of the local bending moment (around the longitudinal axis of the aircraft) applied to the junction points of the fuselage with the shafts of the landing gear under the effect of the loads transmitted by the wheels.

The reduction in the value of this moment makes it possible to reduce the mass of the zones concerned of the fuselage skin or of the gear compartment roof, which in the prior art required reinforcement.

According to one embodiment, said at least one support structure comprises a pair of webs which are substantially parallel to each other, the first support means and the second support means being carried by that pair of webs.

According to one exemplary embodiment, the webs are spaced from each other so as to be able to receive, in the space so formed, the stay and a major part of the leg.

The assembly composed of the intermediate fastening device and of the landing gear is thus more compact.

According to an embodiment, the support means are bearings bored in the webs.

In this way, the main shaft and the stay joint may be inserted and pivot/be hinged therein.

According to one exemplary embodiment, the device further comprises interface means intended to link said at least one support structure and the fuselage, and to be fastened substantially at the location of the reference datum line of the aircraft fuselage.

It is to be recalled that the reference datum line of the fuselage, or reference datum line of the covering (fuselage skin), or neutral line of the fuselage is constituted by barycenters of all the sections of the fuselage covering.

Advantageously, the interface means comprise at least one interface part intended to be fastened, using bolts, to the aircraft fuselage and to said at least one support structure.

The various teachings of the present disclosure also concerns an assembly comprising an aircraft landing gear and a device according to various embodiments.

The various teachings of the present disclosure also concerns an assembly comprising two aircraft landing gears and a device according to various embodiments comprising two support structures and a central box structure.

However, it is also possible to provide two devices with a pair of support structures independent from each other.

The present disclosure also concerns an aircraft comprising one of the aforesaid assemblies.

Advantageously, such an aircraft is provided with a landing gear compartment comprising a roof comprising a web having reinforcing members or diaphragms, extending longitudinally of the aircraft (x-axis of the aircraft frame of reference).

As a matter of fact, the present disclosure is particularly adapted to fuselages having structures of this type, which are both light and strong.

The landing gear compartment may in this regard comprise, in combination or independently, a rear pressurization bulkhead comprising a web and reinforcing members or diaphragms.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description. In the following description, the orientations correspond to those of an aircraft on the ground, which is flat.

Figure 1:
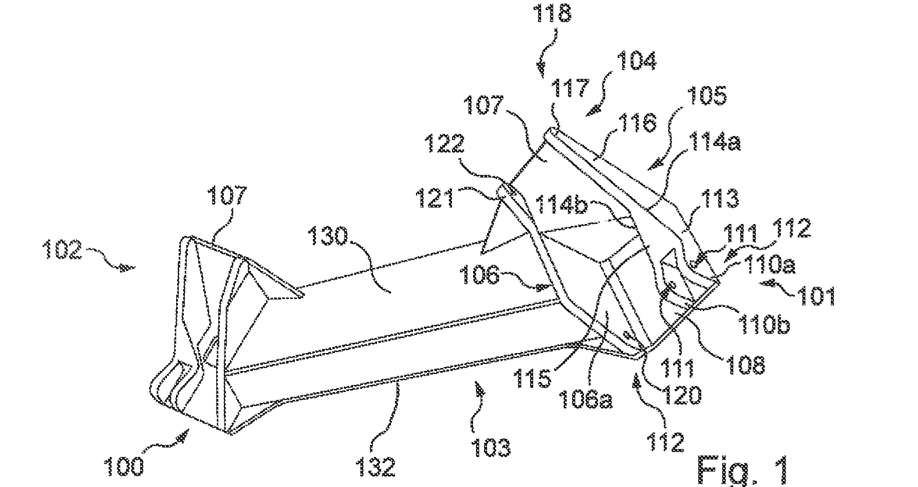
FIG. 1 is a diagrammatic representation in perspective of the intermediate fastening device according to various embodiments.

FIG. 1 represents an intermediate fastening device according to the present disclosure according to various embodiments.

The intermediate fastening device 100 comprises three parts: a right support structure 101 (the term right referring to the orientation of the Figure), a left support structure 102 and a central box structure 103 linking the two support structures.

Figure 2A:
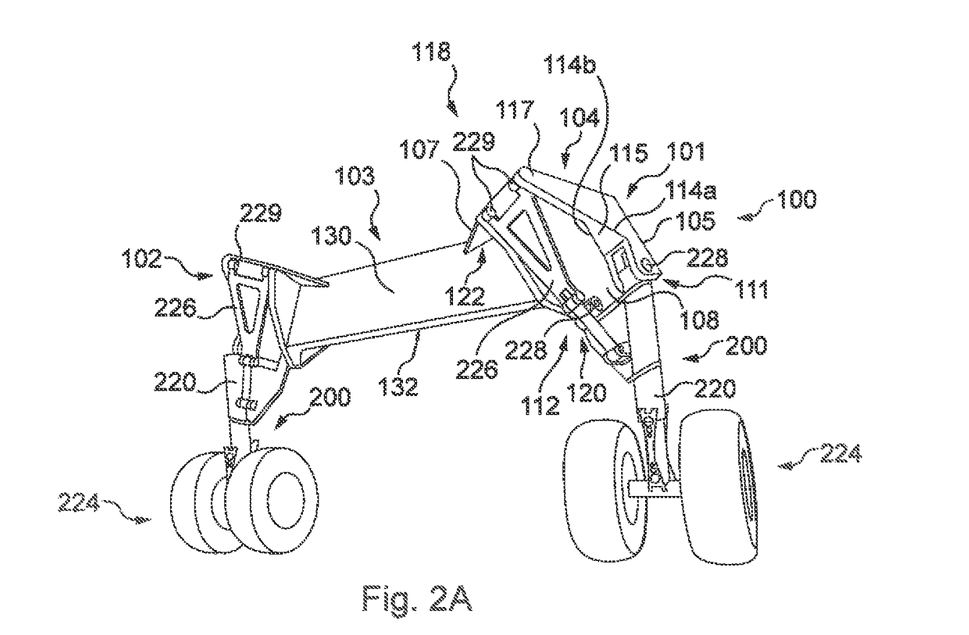
FIG. 2A is a diagrammatic representation in perspective of the intermediate fastening device of FIG. 1 and of two landing gears with which it cooperates, the landing gears being in extended position.
Figure 2B:
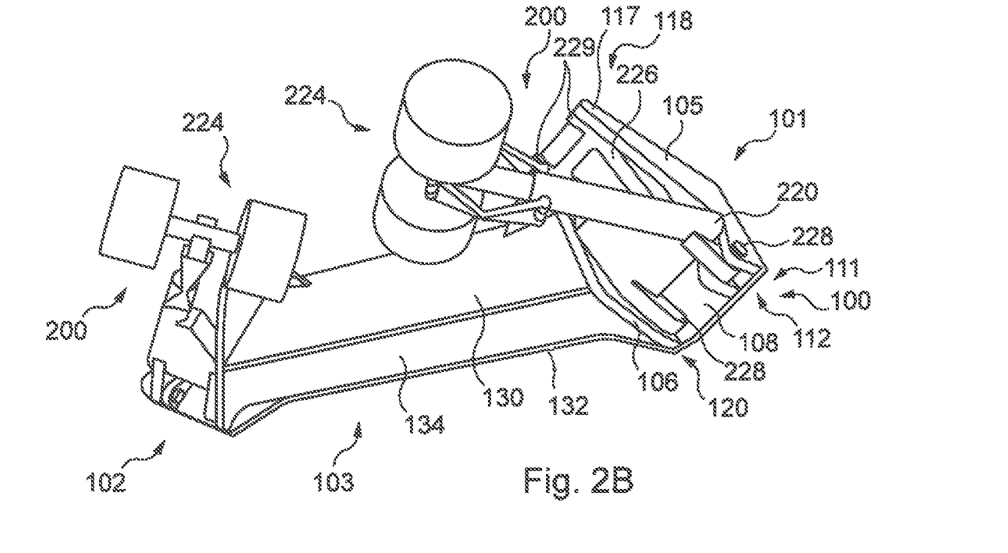
FIG. 2B is a diagrammatic representation in perspective of the parts of FIG. 2A, the landing gears being in retracted position.

It should be noted that in the whole of the description, the terms "left" and "right" qualifying the referenced parts refer to the orientation of FIG. 2 as defined above, regardless of the orientation of the device in the other figures.

The intermediate fastening device 100 being, in the embodiments presented in the figures, symmetrical relative to the center of the central box structure 103, only the right support structure 101 will be described in detail.

The right support structure 101 comprises a pair of webs 104. This pair of webs 104 is composed of an outer web 105 and an inner web 106, which are substantially parallel to each other. The terms inner and outer here refer to the position of the webs relative to the central box structure 103 or relative to the fuselage to which the device is intended to be fastened.

It also comprises a roof web 107 linking the inner 106 and outer 105 webs together at the location of their upper end. The term upper relates here either to the side of the webs that is closest to the fuselage, or to the opposite side to the landing gear.

The right web 101 comprises a back web 108 linking the inner 106 and outer 105 webs together. The surfaces of the back web 108 and those of the roof web 107 form an obtuse angle between them.

The aforesaid four members, i.e. the pair of webs 104, the roof web 107 and the back web 108 thus form the exterior envelope of the right support structure 101.

It is however possible to give an alternative form to the right 101 or left 102 support structures for example by varying the angle between the outer 105 and inner 106 webs and the roof web 107, or for example the angle between the inner 106 and outer 105 webs which may be not quite parallel, without undermining the principles of the present disclosure.

In all cases, the form of the support structure will be advantageously adapted not only to the aircraft for which it is intended to be fastened but also to the landing gear which it is intended to bear as will be seen further on.

The form and the function of the pair of webs 104, of the roof web 107, and of the back web 108, will now be described in more detail.

The outer web 105 has a pair of triangular outer 110a and inner 110b lugs extending in the normal direction to the back web 108. The outer 110a and inner lugs 110b as a pair form a two-branched fork (or jaw)

These outer 110a and inner 110b lugs each comprise, at their end intended to be the closest to the landing gear, a leg outer bearing 111. These leg outer bearings 111 are situated facing each other.

As will be seen later, the leg outer bearings 111 form part of the first support means 112 intended to receive a main shaft of a landing gear leg.

The outer web 105 extends, from the end of the pair of lugs 110a, 110b that is the opposite end to the leg outer bearings 111, getting wider adjacent the lugs 110a, 110b.

This widening 113 takes place along two edge lines, i.e. outer edge line 114a and inner edge line 114b. These outer 114a and inner 114b edge lines respectively go from the outer lug 110a and from the inner lug 110b and extend towards the roof web 107 while coming closer to each other.

The outer 114a and inner 114b edge lines each respectively form an obtuse angle with the outer lug 110a and the inner lug 110b.

The widening 113 thus forms a niche 115. The limit between the lugs 110a, 110b and the widening 113 is hence constituted by a strong edge line.

As can be seen in FIG. 2B, the shape and the size of the niche 115 are in one example, linked to the ability to enable the retraction of the landing gear such that a major part of the leg can be contained in the space between the inner 106 and outer 105 webs.

Before those edge lines 114a, 114b can meet, the inner edge line 114b changes direction so as to be parallel to the outer edge line 114a.

The outer web 105 then continues, still increasing in width adjacent the lugs 110a, 110b but decreasing in thickness relative to the widening 113 so as to form a point 116.

The opposite end of the point 116 to the lugs 110a, 110b has a stay outer bearing 117 which, as will be seen later, forms part of second support means 118 intended to receive a stay joint of a landing gear stay.

As for the inner web 106, this has a trapezoidal main surface 106a. This main surface 106a is substantially parallel to the direction along which the outer web 105 lies.

At the lower corner 119 of the main surface 106a, that situated facing the lugs 110a, 110b, there is a leg inner bearing 120 which is aligned with the leg outer bearings 111.

The leg inner bearing 120 constitutes, together with the leg outer bearings 111, the first support means 112.

The inner web 106 also has a tab 121 which extends the main surface 106a. The tab 121 forms an angle relative to the main surface 106a on going away from the outer web 105.

The tab 121 comprises a stay inner bearing 122. The stay inner bearing forms part of the second support means 118 in combination with the stay outer bearing 117.

Lastly, the back web 108 links the two webs, inner 106 and outer 105, while being perpendicular to the main surface 106a and perpendicular to the outer and inner lugs 110a, 110b.

A description will now be made of the central box structure 103 as well as of its fastening to the left support structure 102 and to the right support structure 101.

The central box structure 103 is hollow, its cross-section comprising four sides. It may however take on other forms, for example a cylindrical form.

In one example, the central box structure comprises a front wall 130, a rear wall 132, and linking walls 134 linking those two walls.

The front and rear walls 130, 132 are, in the exemplary embodiment represented in those drawings, substantially parallel. It is however possible, without undermining their functions, for them to form an angle between them.

The linking walls 134 are substantially perpendicular here to the front 130 and rear 132 walls. Nevertheless, it may perfectly well be envisioned for the walls to form a different angle between them.

Thus, the linking walls 134 and the front 130 and rear 132 walls form the envelope of the central box structure so as to confer upon it an elongate shape. In this case, the shape is parallelepiped.

In the exemplary embodiment shown in the Figures, the front 130 and rear 132 walls extend on opposite sides of each of the right 101 and left 102 support structures. Moreover, the width of the front 130 and rear 132 walls does not exceed the height of the right 101 and left 102 support structures.

To enable the fastening of the central box structure 103 to the right 101 and left 102 support structures, the roof web 107 extends, while remaining planar, as far as the front wall surface 130.

As regards the front wall 130, this is directly linked to the inner web 106.

Lastly, the rear wall 132 is linked to the back web 108 of the right 101 and left 102 support structures.

Alternatively, the assembly composed of the right 101 and left 102 support structures and of the central box structure 103 may be made as a single piece.

It should be noted that whatever its form, the central box structure 103 will be adapted to the geometry or the configuration of the landing gear bay of the aircraft concerned and of the right 101 and left 102 support structures.

The fact of linking the right 101 and left 102 support structures in particular enables the central box structure 103 both to receive and to distribute the forces received by each of the right 101 and left 102 support structures.

Furthermore, as the central box structure 103 is hollow, it may constitute an internal space (housing) in which are disposed for example means (not shown) for imparting motion to the leg and the stay of the landing gear for the extension or the retraction of the landing gear or gears.

This may be items of equipment such as jacks, electrical supply components, motors, actuators, etc.

A description will now be made, with reference to FIGS. 2A and 2B of the cooperation between the intermediate fastening device 100 and two landing gears 200.

The landing gears 200 each comprise a leg 220 provided at one end with wheels 224 and with a Y-shaped stay 226.

The leg 220 is connected, at its opposite end to the wheels 224, to two shafts designated main shafts 228. The direction of orientation of these main shafts 228 is substantially the same as that of the pitch axis of the aircraft.

Regarding the stay 226, this is linked at its end nearest the wheel to the leg 220. At its other end where it divides into two branches of a Y, it is linked to two stay joints 229.

The stay joints 229 are for example ball joints or shafts. In the exemplary embodiment presented in the Figures, they are ball joints.

The main shafts 228 and the stay joints 229 enable the leg 222 to be pivoted around the pitch axis of the aircraft so as to pass the landing gear 200 from an extended position such as that of FIG. 2A, to a retracted position in which the landing gears or train are confined in substantially horizontal position (horizontal position of the aircraft when it is on the ground) such as that of FIG. 2B.

The two main shafts 228 of the leg 220, come to be inserted in the first support means 112, in other words respectively in the leg inner bearing 120, and in the leg outer bearings 111.

Furthermore, the stay joints 229, which are each situated at the end of the branches of the Y formed by the stay 226, come to be inserted into the second support means 118, in other words respectively in the stay inner bearing 122 and in the stay outer bearing 117.

By virtue of these provisions, the loads induced during the movement of the aircraft along the ground by the wheels 224 on the stay joints 229 and the main shafts 228 are taken by the first and second support means 112, 118.

These loads are thereby transferred to the whole support structure 101, which in turn transfers them to the central box structure.

For example, the loads in shear are taken by the back web 108 and the roof web 107, then transmitted to the front 130, rear 132 and linking 134 walls.

As can best be seen in FIG. 2B in which the landing gears are in retracted position, the distance between the inner web 106 and the outer web 105 is advantageously chosen so as to be able to receive the entire stay 226 within the space formed between those two webs.

Furthermore, as can be seen in FIG. 2B in which the landing gears 200 are in retracted position, the distance between the inner web 106 and the outer web 105 is advantageously chosen so as to be able to receive the major part of the leg 220 within the space formed between those two webs.

Similarly, the shape and the size of the niche 115 have been chosen such that the leg 220 comes flush with it.

The dimensions of the right and left support structures 101, 102 are also chosen so as not to exceed the length of the leg 220 such that, in the retracted position of the landing gear 200, the wheels 224 do not touch the outer 105 and inner 106 webs.

FIGS. 3, 4, 5A, 5B, 6, 7 and 8 illustrate the manner in which the intermediate fastening device may be integrated into an aircraft section. It should be noted that the wings of the aircraft are not represented in any of these Figures for reasons of clarity.

Figure 3:
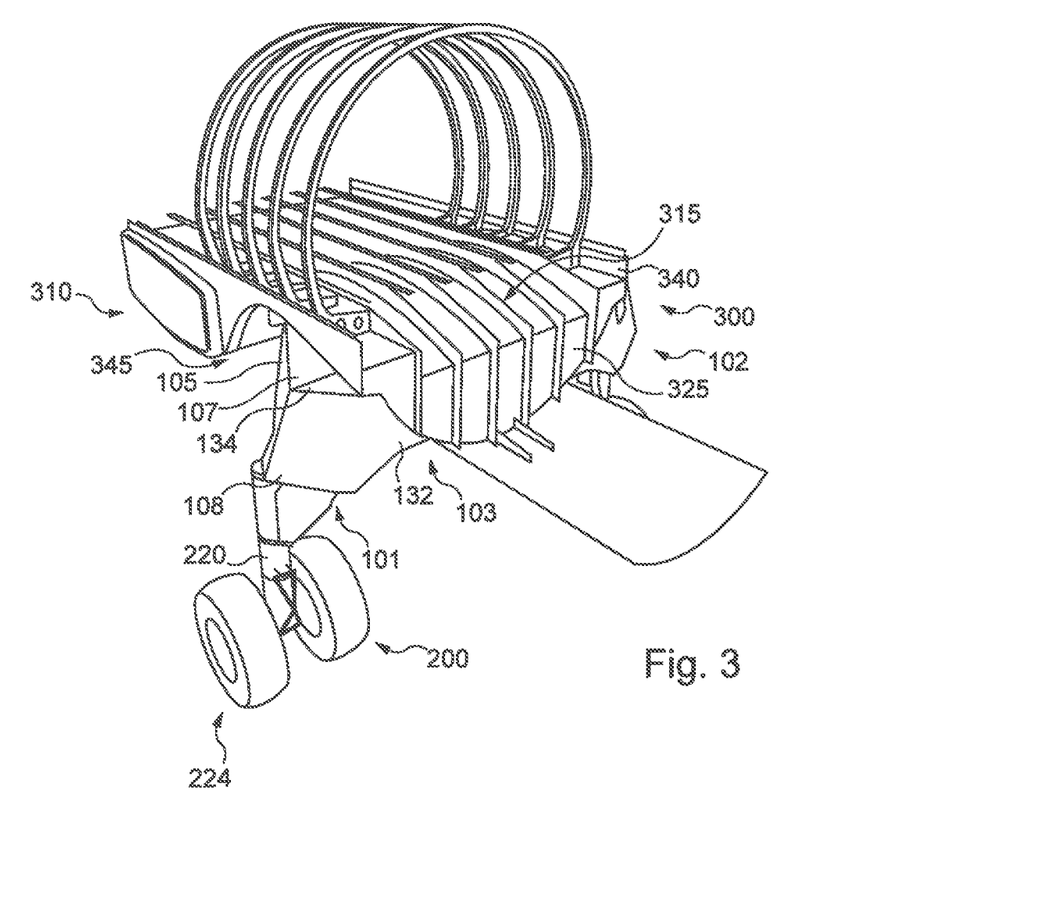
FIG. 3 is a diagrammatic representation in perspective of an aircraft fuselage section provided with the intermediate fastening device and landing gears of FIG. 2A.

As the fuselage section in question is not specific to the present disclosure, a description for it will be given only of the components useful for its interface with the intermediate fastening device 100.

The fuselage section 300 comprises a landing gear bay 310, which itself comprises a bay roof 315 and a rear pressurization bulkhead 325.

For example, the bay roof 315 and the rear pressurization bulkhead 325 are each composed of a web reinforced by reinforcing members or diaphragms, so as to reduce their mass while maintaining the necessary strength properties.

The intermediate fastening device 100 comprises interface means 330 enabling it to be linked to the fuselage section 300. These interface means 330 are fastened substantially at the location of the reference datum line (neutral line) of the covering (of the skin) of the fuselage. The reference datum line of the fuselage is constituted by the barycenters of all the sections of the covering (of the skin) of the fuselage.

Figure 4:
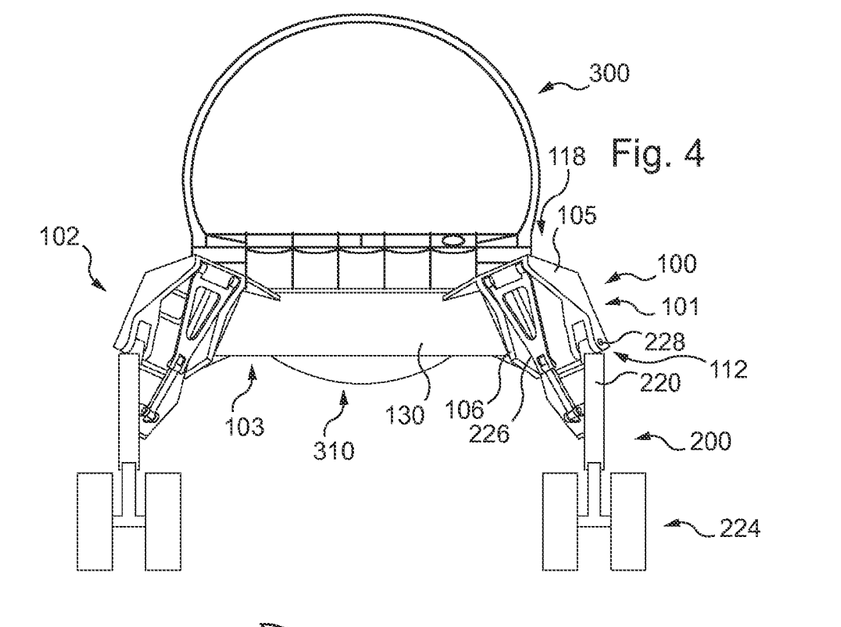
FIG. 4 is a representation in cross-section of the parts of FIG. 3.
Figure 5A:
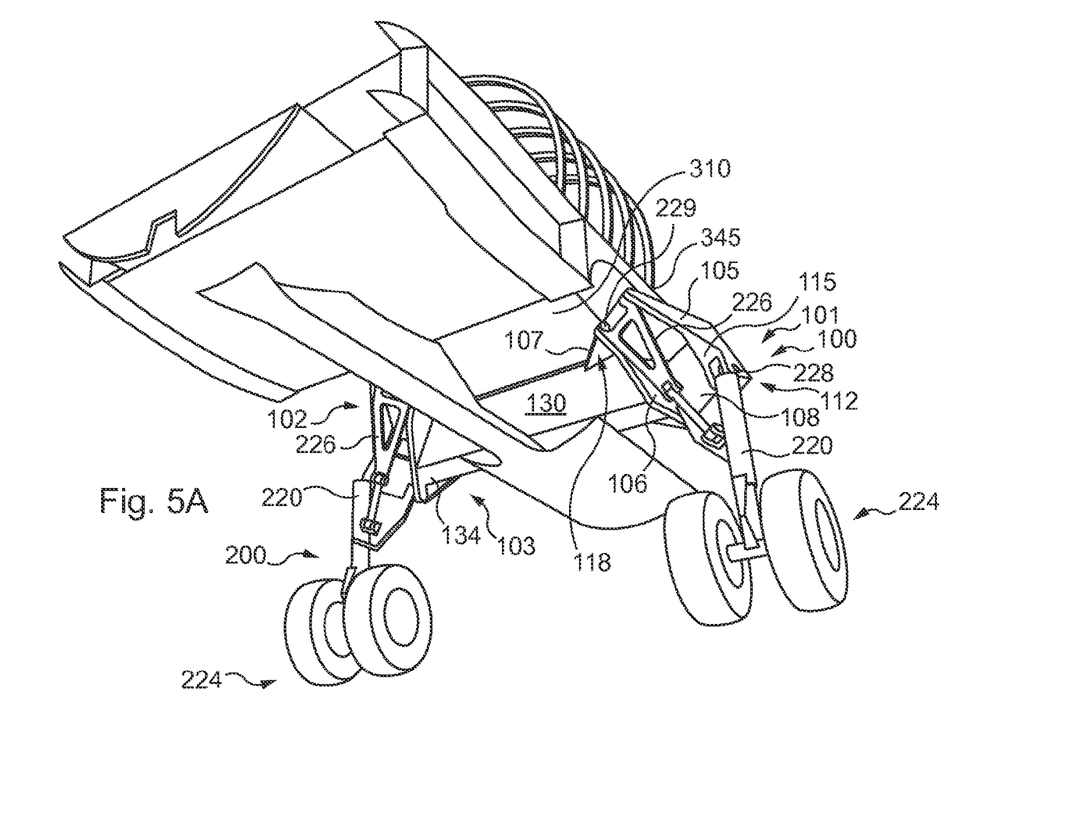
FIG. 5A is a diagrammatic representation of the parts of FIG. 3 from a different angle.
Figure 5B:
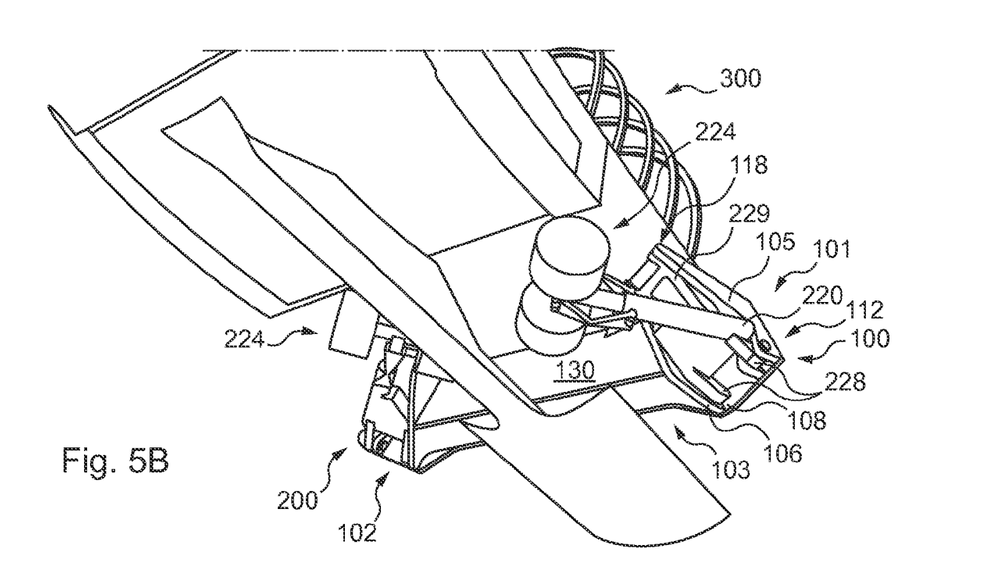
FIG. 5B is a diagrammatic representation of the parts of FIG. 5A, the landing gear being in retracted position.

More specifically, as can be seen in FIG. 4, the left support structure 101 is linked to the right lateral wall 340 of the bay and the right support structure 102 to the right lateral wall 345 of the bay.

The fastening of each left 102 and right 101 support structure is carried out respectively at the location of the lower part of each left 340 and right 345 bay lateral wall, as close as possible to the reference datum line of the fuselage.

For fastening enabling the best transfer of loads induced by the movement of the aircraft along the ground to the section of the fuselage 300 and to limit deformations, the front fastening point 347 is for example situated at the end of the point 116 of the outer web 105.

Still to enable the best transfer of loads, the rear fastening point 348 is situated at the location of the outer end (relative to the fuselage section 300) of the roof web 107.

Figure 6:
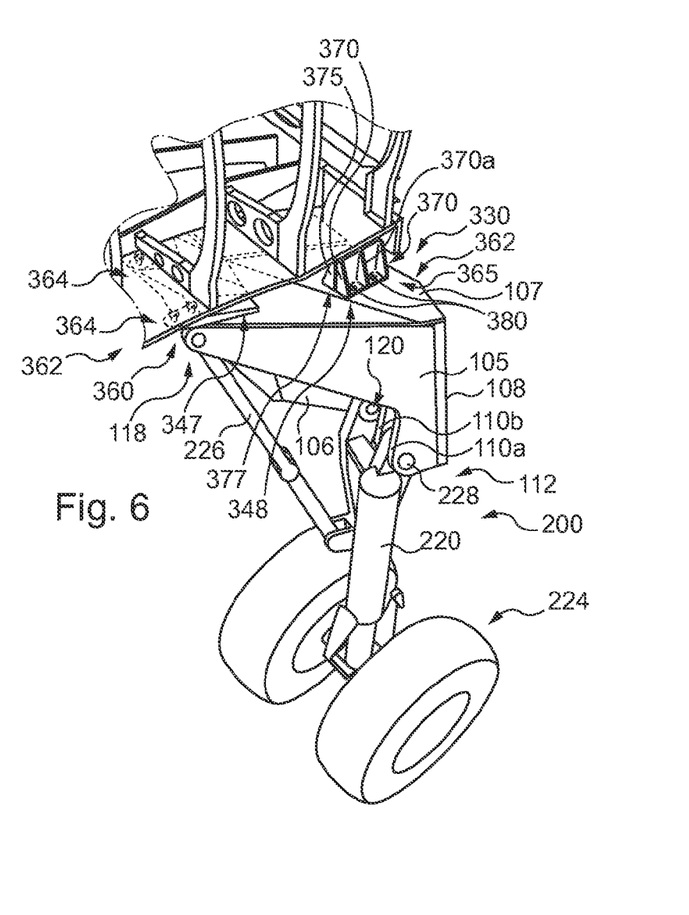
FIG. 6 is an enlargement of a detail of FIG. 3, the left lateral wall of the aircraft bay being concealed.
Figure 7:
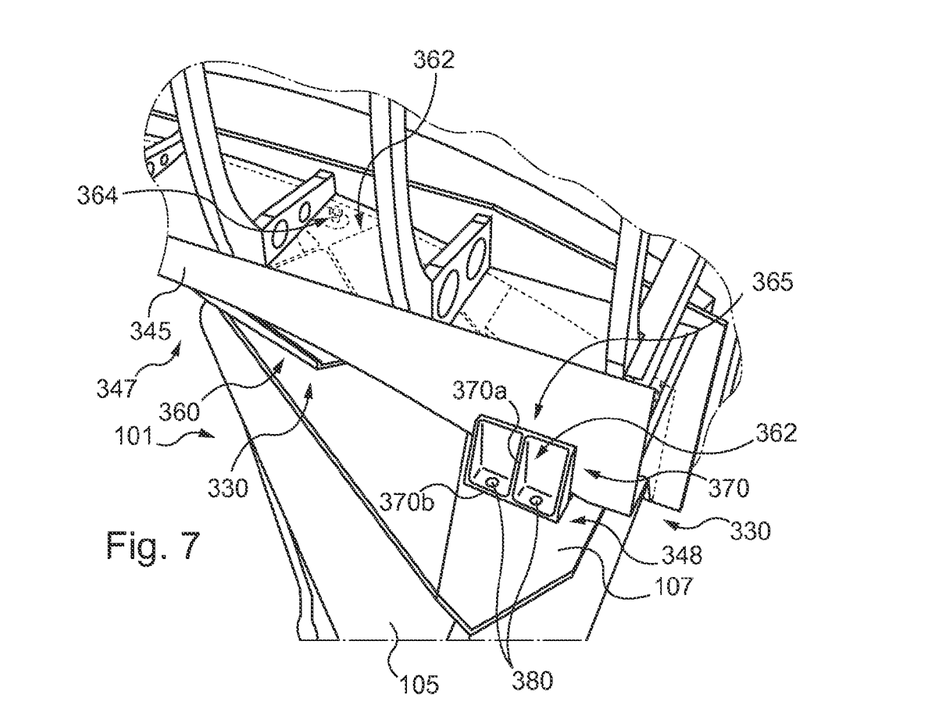
FIG. 7 is an enlargement of a detail of FIG. 6, the left lateral wall of the aircraft bay not being concealed.
Figure 8:
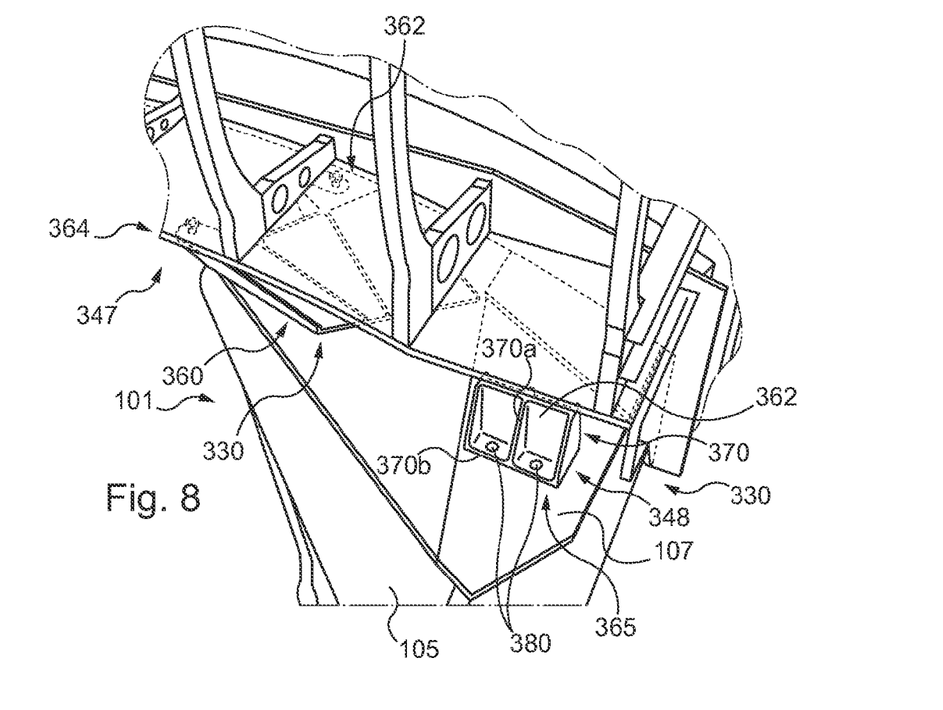
FIG. 8 is an enlargement of a detail of FIG. 6.

In one example, as can be seen in FIGS. 6, 7 and 8, the interface means 330 here comprises a front interface part 360 and a rear interface part 365.

For reasons of clarity, the bay right lateral wall 345 only appears in FIG. 6.

It is to be noted here that the terms front and rear are relative to the position of the intermediate fastening device 100 once the latter has been mounted on an aircraft. As a matter of fact, the front interface part 360 is then the closest to the front of the aircraft whereas the rear interface part 365 is the closest to the rear of the aircraft.

The front 360 and rear 365 interface parts are both fastened to the right support structure 101, and also to the aircraft fuselage section 300, by bolts.

These may be bolts acting in tension or in shear. In another embodiment not shown, the fastening may be carried out by clevis and shackle.

In one example, the front interface part 360 is a plate extending over approximately one third of the length of the roof web 107, and over the width of the right support structure 101.

First front interface part bolts 364 fasten the front interface part 360 to the aircraft fuselage section 300 at the location of the front fastening point 347.

Two first front interface part bolts 364 are situated, on each side of the front interface part 360, at the front end of the front interface part 360.

There are thus four front interface part bolts 364.

However, this number as well as the disposition of the bolts may of course vary.

The rear interface part 365 is composed of an outer bracket 370 and an inner bracket 375 (visible solely in FIG. 6) disposed back to back with a space 377 between them.

The outer bracket 370, which is hollow, is reinforced by a central web 370a which divides it into two identical parts.

The same applies for the inner bracket 375 which is reinforced by a central web (not visible in the Figures).

The outer bracket 370 is fastened to the right support structure 101 by rear interface part bolts 380.

For this, the rear interface part bolts 380 pass through the base 370b of the outer bracket 370 and through the roof web 107 at the location of the rear fastening point 350.

The same applies for the inner bracket which is fastened the right support structure 101 by bolts (not visible in the drawings).

The space 377 is filled, when the intermediate fastening device 100 is mounted on the aircraft, by the bay left lateral wall 340, as can be seen in FIG. 7 which illustrates the cooperation between the rear interface part 360 and the aircraft fuselage section 300.

The outer 370 and inner 375 brackets are for example fastened to the left lateral wall 340 using fastening means such as bolts (not shown), or else are integrated into the left lateral wall 340.

In another embodiment not shown, the intermediate fastening device is composed of two independent support structures (not linked by a box structure), enabling each to bear a landing gear. In this case, the pairs of webs are intended to be fastened on opposite sides of an aircraft.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A device for intermediate fastening between an aircraft fuselage and an aircraft landing gear, the landing gear configured to pivot around at least one main shaft and to be hinged around at least one stay joint to enable the extension or the retraction of the landing gear and comprising a leg having wheels which is linked to the at least one main shaft and a stay coupling the leg to the at least one stay joint, the device comprising:
    at least one support structure including a first support means configured to receive said at least one main shaft and a second support means configured to receive said at least one stay joint; and
    a central box structure coupled to the at least one support structure, the central box structure including a front wall, a rear wall and linking walls connecting the front wall and the rear wall;
    wherein the at least one support structure includes a right support structure and a left support structure linked together by the central box structure, the central box structure configured transverse to the longitudinal axis of the aircraft fuselage when installed on the aircraft.

2. The device according to claim 1, wherein said at least one support structure is hollow.

3. The device according to claim 1, wherein said at least one support structure further comprises two support structures coupled together by the central box structure, and the central box structure is made as a single piece.

4. The device according to claim 1, wherein the central box structure is hollow.

5. The device according to claim 1, wherein the central box structure has an internal space configured for the installation of a means for imparting motion to the leg and the stay for the extension and the retraction of the landing gear.

6. The device according to claim 1, wherein the first and second support means are configured, when the device is mounted on the aircraft fuselage, to be situated in the immediate neighborhood of a reference datum line of the aircraft fuselage.

7. The device according to claim 1, wherein said at least one support structure further comprises a pair of webs which are substantially parallel to each other, the first support means and the second support means being carried by the pair of webs.

8. The device according to claim 7, wherein webs of the pair of webs are spaced from each other and configured to receive, in the space so formed, the stay and a portion of the leg.

9. The device according to claim 8, wherein the first and second support means are bearings bored in the webs.

10. The device according to claim 6, further comprising an interface means configured to link said at least one support structure and the aircraft fuselage, the interface means fastened substantially at the location of the reference datum line of the aircraft fuselage.

11. An assembly, comprising:
    an aircraft landing gear configured to pivot around at least one main shaft and to be hinged around at least one stay joint to enable the extension or the retraction of the landing gear and comprising a leg having wheels which is linked to the at least one main shaft and a stay coupling the leg to the at least one stay joint; and
    a device for intermediate fastening between an aircraft fuselage and the landing gear, comprising:
        at least one support structure including a first support means configured to receive said at least one main shaft and a second support means configured to receive said at least one stay joint, the at least one support structure being hollow; and a central box structure coupled to the at least one support structure, the central box structure including a front wall, a rear wall and linking walls connecting the front wall and the rear wall;

wherein the at least one support structure includes a right support structure and a left support structure linked together by the central box structure, the central box structure configured transverse to the longitudinal axis of the aircraft fuselage when installed on the aircraft.

12. An aircraft, comprising:

a fuselage;

a landing gear configured to pivot around at least one main shaft and to be hinged around at least one stay joint to enable the extension or the retraction of the landing gear and comprising a leg having wheels which is linked to the at least one main shaft and a stay coupling the leg to the at least one stay joint; and a device for intermediate fastening between the fuselage and the landing gear, comprising:

two support structures, each support structure including a first support means configured to receive said at least one main shaft and a second support means configured to receive said at least one stay joint; and a central box structure coupled to the two support structures, the central box structure including a front wall, a rear wall and linking walls connecting the front wall and the rear wall;

wherein two support structures comprise a right support structure and a left support structure linked together by the central box structure, the central box structure configured transverse to the longitudinal axis of the aircraft fuselage when installed on the aircraft.

13. The assembly according to claim 11, wherein said at least one support structure further comprises two support structures coupled together by the central box structure, and the central box structure is made as a single piece.

14. The assembly according to claim 11, wherein the central box structure is hollow.

15. The assembly according to claim 11, wherein the central box structure has an internal space configured for the installation of a means for imparting motion to the leg and the stay for the extension and the retraction of the landing gear.

16. The aircraft according to claim 12, wherein the first and second support means are configured, when the device is mounted on the fuselage, to be situated in the immediate neighborhood of a reference datum line of the fuselage.

17. The aircraft according to claim 12, wherein at least one of the two support structures further comprises a pair of webs which are substantially parallel to each other and the first support means and the second support means are carried by the pair of webs.

18. The aircraft according to claim 16, further comprising an interface means configured to link said at least one support structure and the fuselage, the interface means fastened substantially at the location of the reference datum line of the fuselage.

19. The aircraft according to claim 12, wherein at least one of the two support structures is hollow.

* * * * *